United States Patent [19]

Goto et al.

[11] 4,085,295
[45] Apr. 18, 1978

[54] MULTI-FREQUENCY SIGNAL RECEIVERS

[75] Inventors: Tadahiro Goto, Tachikawa; Munemasa Soma, Tokyo, both of Japan

[73] Assignee: Iwatsu Electric Co., Ltd., Tokyo, Japan

[21] Appl. No.: 727,346

[22] Filed: Sep. 28, 1976

[30] Foreign Application Priority Data

Oct. 1, 1975 Japan ............... 50-117635

[51] Int. Cl.$^2$ ........................... H04M 1/50
[52] U.S. Cl. ............................. 179/84 VF
[58] Field of Search ............ 179/84 R, 84 VF; 328/137, 138, 140

[56] References Cited

U.S. PATENT DOCUMENTS

| | | | |
|---|---|---|---|
| 3,140,357 | 7/1964 | Bischof | 179/84 VF |
| 3,299,216 | 1/1967 | Beyerle | 179/84 VF |
| 3,701,857 | 10/1972 | Usuda | 179/84 VF |
| 3,715,518 | 2/1973 | Campbell | 179/84 VF |
| 3,795,775 | 3/1974 | Cowpland | 179/84 VF |
| 3,934,096 | 1/1976 | Kusano | 179/84 VF |

*Primary Examiner*—Kathleen H. Claffy
*Assistant Examiner*—Joseph A. Popek
*Attorney, Agent, or Firm*—Oblon, Fisher, Spivak, McClelland & Maier

[57] ABSTRACT

A multi-frequency signal receiver comprising an automatic gain control circuit for adjusting the level of the multi-frequency signal, a plurality of bandpass filters for separating the output from the automatic gain control circuit into respective frequency signals, the bandpass filters being grouped into two groups, two detectors respectively detecting the outputs from the two groups of the bandpass filters for producing output voltages respectively proportional to the outputs from the two groups, a recognition circuit for producing an output when the level of the sum of the outputs from the two detectors exceeds a predetermined level, and a plurality of gate circuits respectively responsive to the output from the recognition circuit for passing the outputs from the plurality of bandpass filters.

3 Claims, 12 Drawing Figures

MULTI-FREQUENCY SIGNAL RECEIVERS

BACKGROUND OF THE INVENTION

This invention relates to a signal receiver for receiving multi-frequency signals sent from a push button dial telephone set or the like.

A prior art multi-frequency signal receiver is disclosed in U.S. Pat. Nos. 3,076,059 of the title Voice Frequency Signal System and No. 3,128,349 of the title Multi-frequency Receiver both assigned to Western Electric Co. Inc., U.S.A. The multi-frequency signal receivers disclosed in these patents generally comprise an input circuit, band elimination filters, amplitude limiters, band pass filters, voltage level detectors, OR logic circuits, AND logic circuit, an input signal continuation supervisory timer, and output gate circuits.

With a recent trend of using a push button dial telephone set, when using a multi-frequency signal receiver for a miniature telephone exchange set and for a push button telephone set, miniaturization and economization of the signal receiver are important problems. In the systems disclosed in said U.S. patents, the component element that hinders the miniaturization and economization comprises band elimination filters which are used to separate high and low frequency components. Such filter should be accurate because the highest frequency (941 Hz) of the low frequency components and the lowest frequency of the high frequency components (1209 Hz) are close to each other.

SUMMARY OF THE INVENTION

Accordingly, an object of this invention is to provide a small and economic multi-frequency signal receiver not utilizing such band elemination filters which have been one of the essential component elements of the prior art multi-frequency signal receiver.

Suppose now that signals having different frequencies are subjected to uniform attenuation by a transmission line, it is possible to obtain a perfect receiver when a constant voltage level detector is connected after a bandpass filter. However, due to the inclined attenuation characteristic of a typical telephone transmission line the minimum frequency 697 Hz of the low frequency components is subjected to a larger attenuation than the maximum frequency 1633 Hz of the high frequency components.

The receiver of this invention is constructed to operate normally even when different frequency signals of the high frequency components have different input levels and different frequency signals of the low frequency components have different input levels due to the attenuation caused by the transmission line.

Since the maximum value of the difference in the input levels of the signals of the high frequency components to be received normally and the maximum value of the difference in the input levels of the signals of the low frequency components are limited to ± 5 dB according to the present regulation concerning telephone exchange receivers, the receiver of this invention is designed to have a maximum value above this limit.

According to this invention, there is provided a multi-frequency signal receiver adapted to receive a multi-frequency signal constituted by combining one of frequency signals selected from a plurality of signal groups each consisting of a plurality of signals having different frequencies, said receiver comprising an automatic gain control circuit for adjusting the level of the multi-frequency signal, a plurality of bandpass filters for separating the output from the automatic gain control circuit into respective frequency signals, the bandpass filters being grouped into two groups, two detectors respectively detecting the outputs from the two groups of the bandpass filters for producing output voltages respectively proportional to the outputs from the two groups, a recognition circuit for producing an output when the level of the sum of the outputs from the two detectors exceeds a predetermined level, and a plurality of gate circuits respectively responsive to the output from the recognition circuit for passing the outputs from the plurality of bandpass filters.

In a modification, a timer is connected between the recognition circuit and the plurality of gate circuits for producing an output when the output from the recognition circuit continues for an interval longer than a predetermined interval.

DESCRIPTION OF THE PREFERRED EMBODIMENTS

Figure 1:
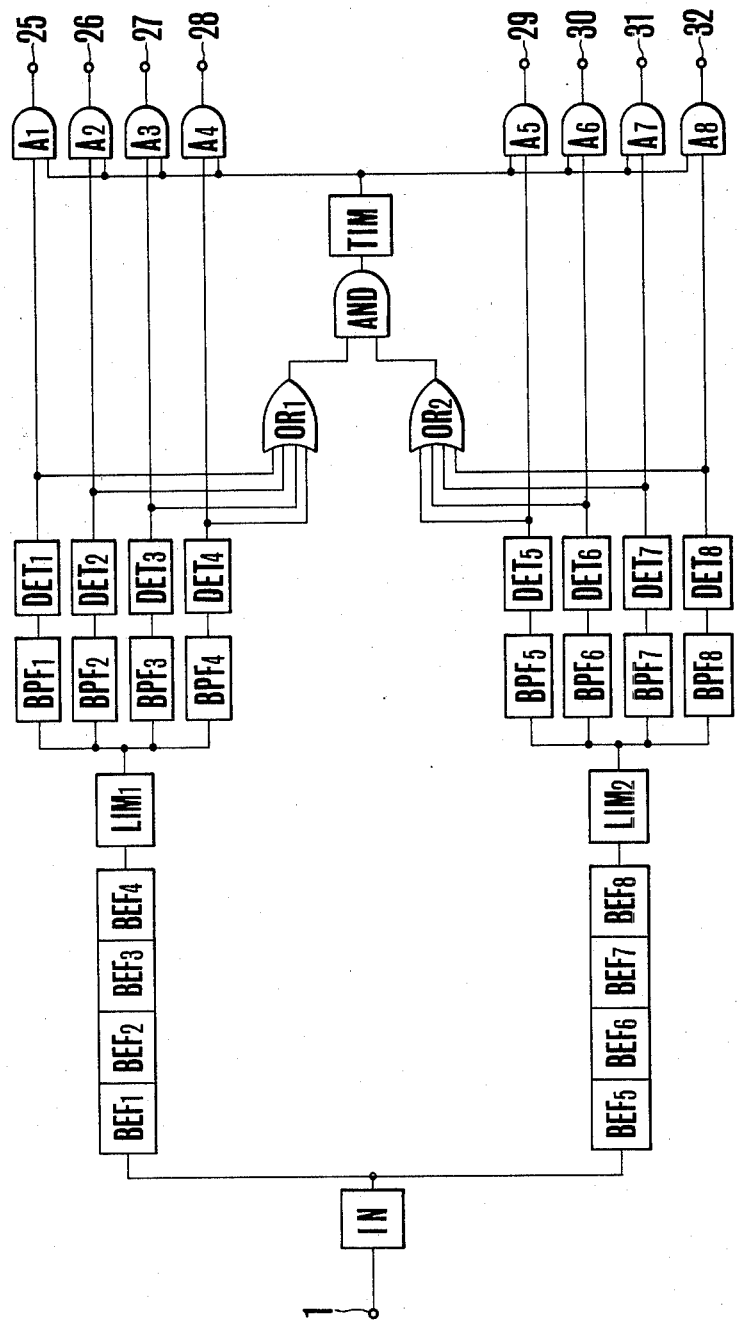
FIG. 1 is a block diagram showing one example of a prior art multi-frequency signal receiver.

As shown in FIG. 1, a prior art multi-frequency signal receiver generally comprises an input circuit IN, band elimination filters $BEF_1$ through $BEF_8$, amplitude limiters $LIM_1$ and $LIM_2$, bandpass filters $BPF_1$ through $BPF_8$, voltage level detectors $DET_1$ through $DET_8$, logical sum circuits $OR_1$ and $OR_2$, a logical product circuit AND, an input signal continuation supervisory timer TIM, and output gate circuits $A_1$ through $A_8$. Low band elimination filters $BEF_1$ through $BEF_4$ are used for the purpose of eliminating signals having high frequency components whereas high band elimination filters $BEF_5$ through $BEF_8$ are used for the purpose of eliminating signals having low frequency components, so that so-called 4 × 4 type multi-frequency signals from the input circuit are separated into two groups by the band elimination filters $BEF_1$ through $BEF_8$.

Figure 2:
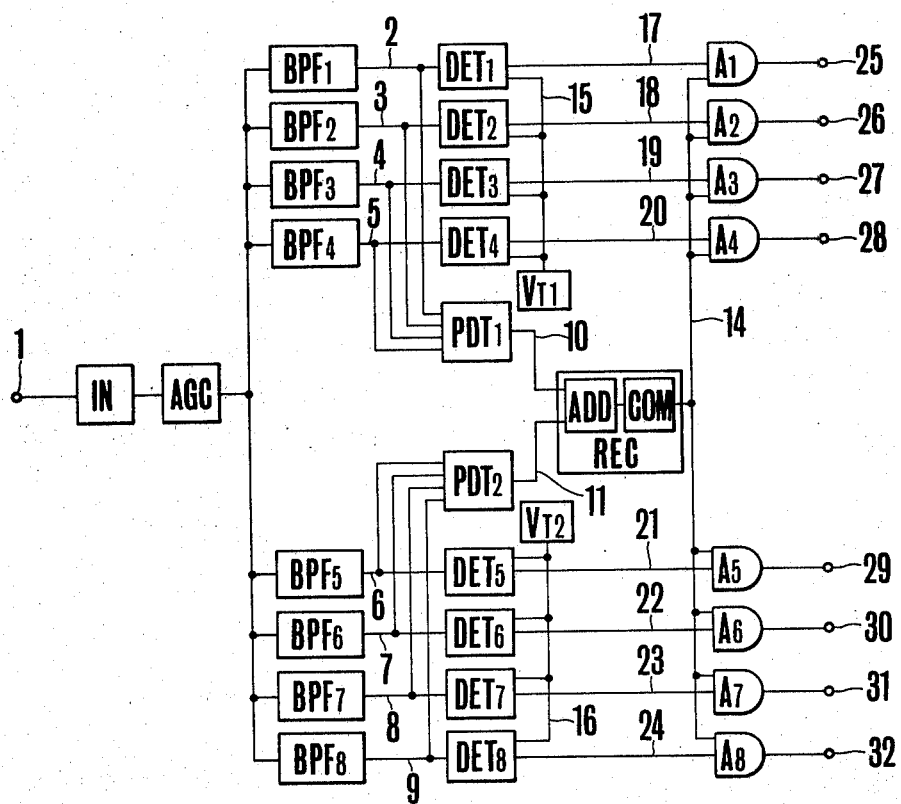
FIGS. 2A and 2B are block diagrams showing different embodiments of this invention.
Figure 2:
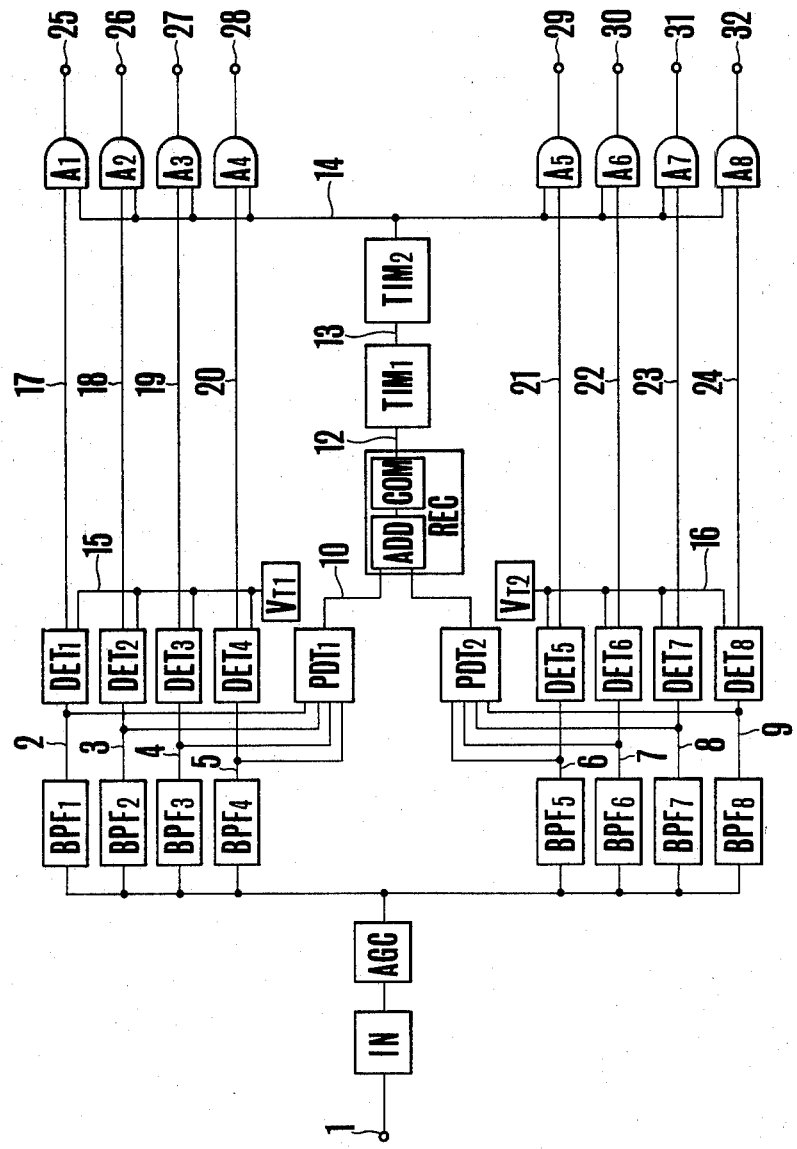

As shown in FIG. 2A, according to multi-frequency signal receiver of this invention, different from the prior art receiver, no band elimination filter is used. Thus, according to this invention, an automatic gain control circuit AGC is connected on the output side of the input circuit so as to precontrol a composite signal of high and the low frequency group signals according to predetermined input-output level adjusting characteristics such that the level of the composite signal becomes constant and the difference in levels between the low and high frequency signals is kept unchanged. Accordingly, when the frequency signals selected from respective groups are added together by a recognition circuit on a succeeding stage, the sum level will be constant. When the sum level exceeds a predetermined level, it is recognized that a multi-frequency signal comprising the sum of two frequency signals respectively selected from signals of high and low frequency groups (that is a multi-frequency signal corresponding to a cross-point of a matrix constituted by the signals of the high and low frequency groups) is received, for example, a push-button dial signal. The invention is based on this fact.

In FIG. 2A, two voice frequency signals arrive at the multi-frequency signal receiver through a subscribers line 1. The input circuit IN operates to provide the impedance matching and the input sensing level. Where composite signals of the low and high frequency signals arriving at a multi-frequency signal receiver have different amplitudes, the amplitudes of the composite signals are adjusted to be constant by the automatic gain control circuit AGC but the level difference between the respective signals $fH$ of the high frequency group and the respective signals of the low frequency group $fL$ is not varied.

Figure 3:
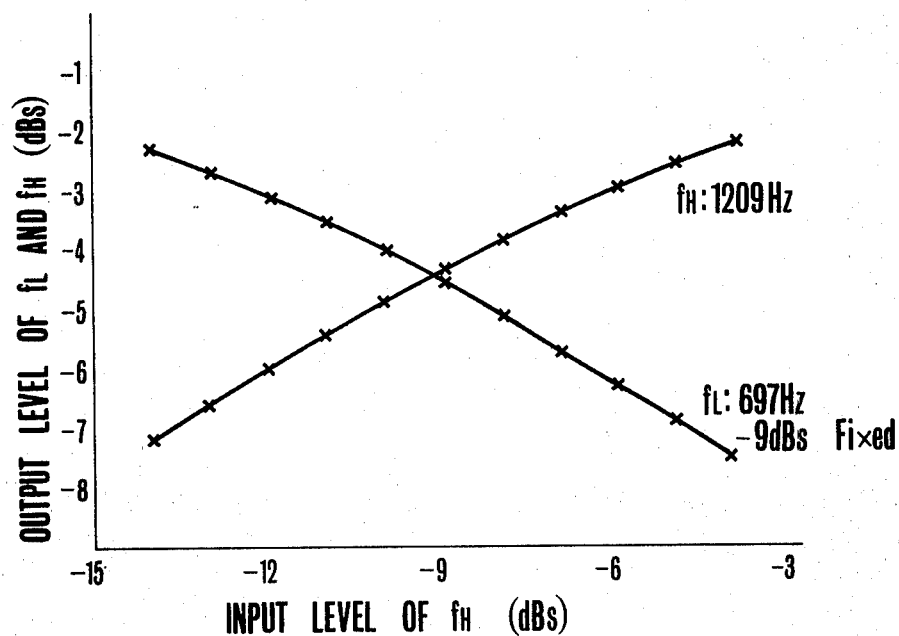
FIG. 3 is a graph showing the input-output characteristics of an automatic gain control circuit utilized in this invention.

FIG. 3 shows one example of the input-output characteristics of the automatic gain control circuit AGC actually used. As will be seen from FIG. 3, even when the input level of the low frequency signal $fL$ is fixed to $-9dB_s$, the output level of the signal $fL$ is varied in a predetermined relationship with the output level of the high frequency signal $fH$ as the input level of the signal $fH$ varies. For example, with an input level of $fH$ of $-6dB_s$, the signal $fL$ which is fixed to $-9dB_s$ in terms of input level has an output level of $-6dB_s$ while the signal $fH$ having an output level of $-3dBs$. Accordingly, the input level difference between signals $fL$ and $fH$ is $9 - 6 = 3(dBs)$ and the output level difference between signals $fL$ and $fH$ is $6 - 3 = 3(dBs)$. In this manner, by the aid of the automatic gain control circuit, the level difference between the signals $fL$ and $fH$ on the input side is made equal to that on the output side inasmuch the level of a composite signal of signals $fL$ and $fH$ is controlled to be constant.

The output from the automatic gain control circuit AGC is coupled to bandpass filters $BPF_1$ through $BPF_8$ for respective frequencies and each bandpass filter passes to a succeeding stage the AC component of the frequency signal in its specific frequency band while maintaining the relative amplitudes of the signals.

The output terminals 2 to 5, and 6 to 9 of the respective bandpass filters are coupled to rectifying and smoothing filter circuits $PDT_1$ and $PDT_2$ respectively so that signals transmitted through respective bandpass filters $BPF_1$ through $BPF_8$ are converted into signals having voltage levels proportional to the AC output signals. Where the signal received by the receiver comprises only the normal voice frequency dial signal, the output from an adder, ADD which adds the output signals 10 and 11 of respective filters $PDT_1$ and $PDT_2$ for respective groups always has a constant value even when the input signals have different levels.

When this constant voltage is detected by a voltage comparator COM, output gate circuits $A_1$ through $A_8$ are enabled whereby to supply to the output terminals 25 through 32 the output signals of the bandpass filters $BPF_1$ through $BPF_8$ having levels above the levels set in the detectors $DET_1$ through $DET_8$ by the detection level setting circuits $VT_1$ and $VT_2$ respectively. Thus, the outputs correspond to the push button dial digits. The adder ADD and the voltage comparator COM cooperate to constitute a judging or recognition circuit.

An actual regulation concerning the sensing frequency band which is one of the important evaluation references of a multi-frequency signal receiver will now be described.

Figure 4:
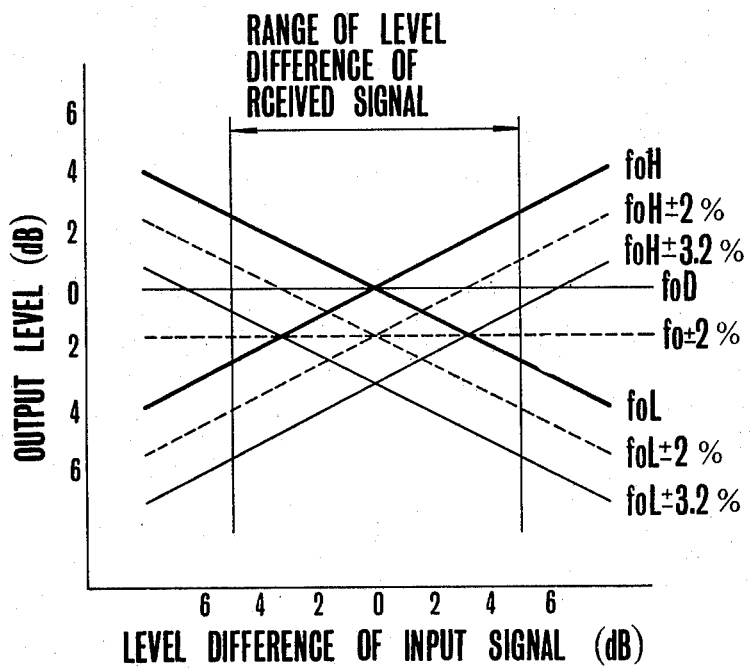
FIG. 4 is a graph showing the input-output characteristics of a bandpass filter utilized in this invention.

FIG. 4 shows input-output characteristics of a bandpass filter where the levels of the dial signals are different. In FIG. 4 $foH$ represents the center frequency of the dial signals of the high frequency group, $foL$ the center frequency of the dial signals of the low frequency group and $foL \pm 2\%$, $foL \pm 2\%$ show characteristics where the frequencies are shifted $\pm 2\%$ from the center frequencies of the dial signals of the high and low frequency groups. Similarly, $foH \pm 3.2\%$ and $foL \pm 3.2\%$ show characteristics where the frequencies are shifted $\pm 3.2\%$ from the center frequencies of the dial signals of the high and low frequency groups respectively. Symbol $foD$ represents the output voltage level of the adder ADD where inputs $foH$ and $foL$ are applied to the bandpass filters. Where inputs represented by the characteristic $foH$ and $foL$ and having a level difference of less than 5dB are applied to the bandpass filters, the outputs having such level difference are detected by detectors $PDT_1$ and $PDT_2$ and the detected outputs are added to each other by adder ADD to obtain a signal having a constant level $foD$. This voltage level is detected by the voltage comparator COM to enable the output gate circuits $A_1$ though $A_8$ by the comparator output thus producing a two frequency received signal. Actually, however, due to the difference in the push button dial oscillation circuits, the dial signal frequency shifts about $\pm 1.5\%$ with respect to the center frequency, so that it is necessary to design the receiver to receive signals having frequencies deviating more than $\pm 1.5\%$ from the center frequency. However, when the receiving frequency band is widened there is a trouble of causing an error in the voice signal due to unwanted false signals.

Figure 5:
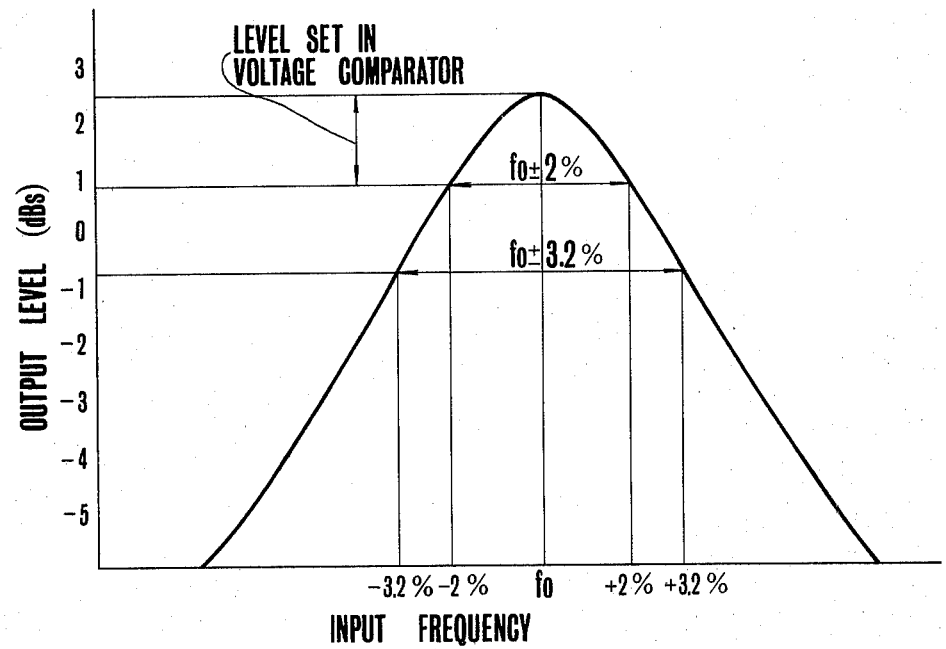
FIG. 5 is a graph showing the relationship between the set level of the voltage comparator and the frequency hand of the bandpass filter utilized in this invention.

In the following description, it is assumed that the receiver is designed such that it can receive signals having a frequency shift of the minimum of $\pm 2\%$ with respect to the center frequency. For frequencies shifted $\pm 2\%$ from the center frequency $fo$, the output levels of the bandpass filters will be represented by the characteristics $fH \pm 2\%$ and $fL \pm 2\%$ shown in FIG. 4. However, such outputs can not be detected because their levels are lower than the detection level with the result that the normal receiving is not possible. Accordingly, the detection becomes possible when the detection level is decreased to $fo \pm 2\%$. FIG. 5 shows the relationship between the level set in the voltage comparator of the receiving band of the bandpass filters. Actually, the condition of the level of $fo \pm 2\%$ can be fulfilled by the conditions other than the above described conditions $foH \pm 2\%$ and $foL \pm 2\%$. In an extreme case, even when the input signals of the high (low) frequency group an $foH$ or when the input signals of the low (high) frequency group are $foL \pm 3.2\%$ it is possible to detect the input signals at levels of $fo \pm 2\%$. These relationships are shown by FIGS. 4 and 5.

As above described according to this invention it is possible to economically fabricate the receiver and to distinctly define the receiving band with the desired characteristics.

FIG. 2B shows a modified embodiment of this invention wherein a timer for supervising the continuity of the input signal and an output timer are added to the embodiment shown in FIG. 2A. The timer $TIM_1$ produces an output when the input signal or the output signal from the detection circuit DET continues for an interval longer than a prescribed internal (for example 40 milli-seconds thus improving the recognition of the normal dial signals from the false signals, and the output timer $TIM_2$ is added where a circuit to be driven by the output from the multi-frequency signal receiver requires continuation of the output for a predetermined interval.

Figure 6:
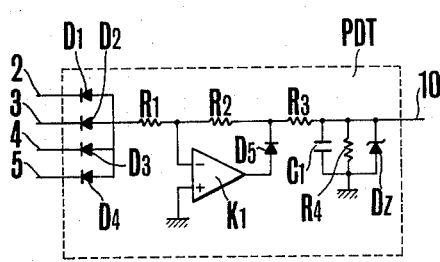
FIG. 6 is a connection diagram of the rectifying and smoothing filter circuit.
Figure 7:
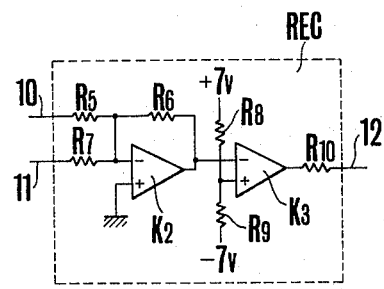
FIG. 7 is a connection diagram of the recognition circuit.
Figure 10:
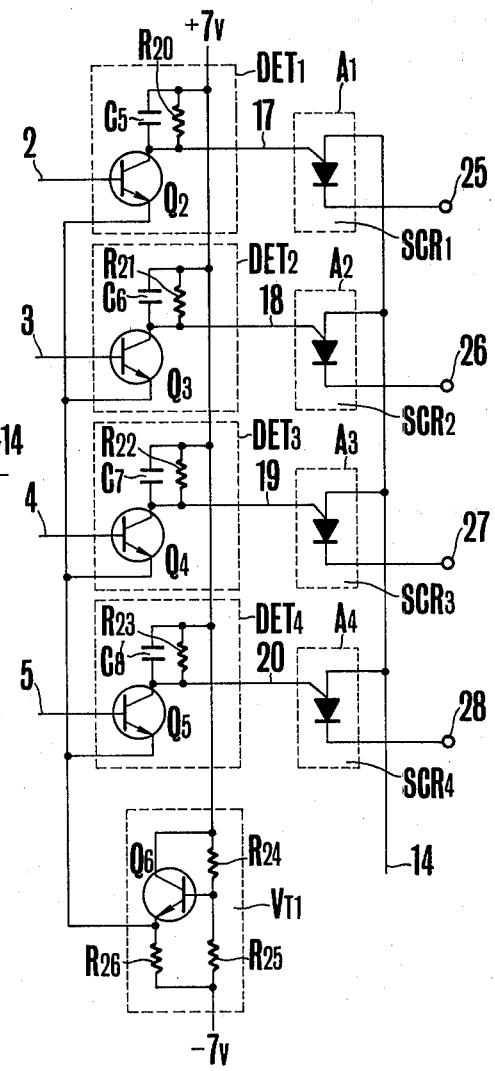
FIG. 10 is a connection diagram of the detector and the output gate.
Figure 11:
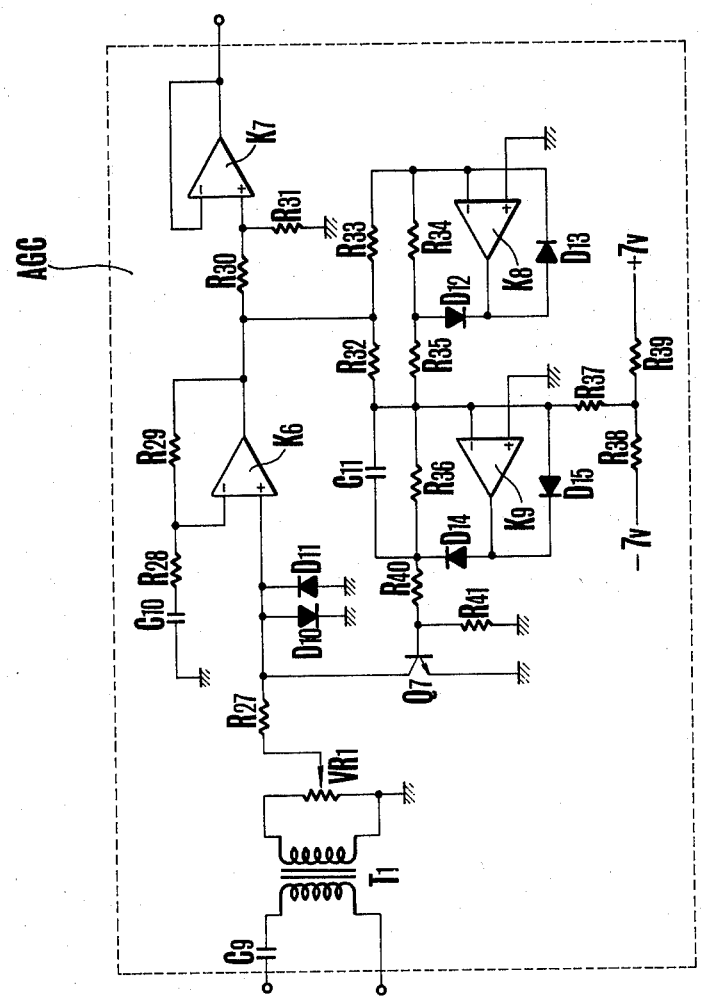
FIG. 11 is a connection diagram of the automatic gain control circuit.

Referring now to FIGS. 6 to 11, a signal flow in the multi-frequency signal receiver of the present invention will be traced in detail. An AC composite signal of a low frequency signal and a high frequency signal fed to the input of an automatic gain control circuit as shown in FIG. 11 is transmitted via a transformer $T_1$, a potentiometer $VR_1$, a resistor $R_{27}$ and an anti-parallel connection of diodes $d_{10}$ and $D_{11}$ to a first non-inverted amplifier consisting of an operation anplifier $K_6$, resistors 28 and 29 and a capacitor $C_{10}$. Positive and negative excessive amplitudes of the AC composite signal are clamped by the parallel diodes $D_{10}$ and $D_{11}$. Since there is provided a feedback circuit between the output of the first amplifier and the positive input thereof, an AC output signal is fedback to the input side of the first amplifier, the feedback circuit including three amplifiers of operation amplifiers $K_8$ and $K_9$ and a transistor $Q_7$. The operational amplifiers $K_8$ and $K_9$ are associated with diodes $D_{12}$ and $D_{13}$ and diodes $D_{14}$ and $D_{15}$, respectively, to form a fullwave rectifier circuit. Thus, amplifiers $K_8$ and $K_9$ together with resistors 32 through 36 and a capacitor $C_{11}$ improve the rectification characteristics of the fullwave rectifier. A rectified signal propotional to the AC output of the first amplifier is applied to the base of the transistor $Q_7$ so that the collector current therethrough is controlled to vary the input impedance for the first amplifier. It will be appreciated that the variation in input impedance changes the gain of the first amplifier. In this manner, the amplitude of any AC composite signals is maintained at a predetermined level. An operational amplifier $K_7$, along with resistors $R_{30}$ and $R_{31}$, constitutes a second non-inverted amplifier which acts as a buffer. Obviously, the buffer delivers an AC output of a predetermined level. The AC composite signal of the predetermined level is filtered by bandpass filters $BPF_1$ to $BPF_8$. Now assume that an AC signal of a specified frequency appears on a line 2. The AC signal is rectified and smoothed after being passed through a rectifying and smoothing filter circuit $PDT_1$ as shown in FIG. 6 which is constituted with a rectifier diode $D_1$, an amplifier of resistors $R_1$ and $R_2$, an operational amplifier $K_1$ and a diode $D_5$, and a smoothing filter of a resistors $R_3$ and $R_4$, a capacitor $C_1$ and a Zener diode DZ. A rectified signal thus produced on a line 10 is added to another rectified signal fed through the other channel to a line 11 and a sum is compared with a reference level in a recognition circuit REC as shown in FIG. 7. As clearly seen from FIG. 7, the recognition circuit REC consists of an adder of an operational amplifier $K_2$ and resistors $R_5$ through $R_7$ and a comparator of an operational amplifier $K_3$ and resistors $R_8$, $R_9$ and $R_{10}$.

When a DC signal having a level above a reference voltage appears on a line 12 connected to a line 14, as shown in FIG. 10, a thyristor $SCR_1$ is triggered to pass the AC signal of the specified frequency to a terminal 25 via a detector $DET_1$, a line 17 and an output gate $A_1$. The AC signal to be passed through these circuit, however, must have an amplitude greater than a predetermined level since a constant voltage circuit $VT_1$ is connected to the emitter of a transistor $Q_2$. The detector $DET_1$ essentially comprises the transistor $Q_2$, a load resistor $R_{20}$ and a capacitor $C_5$ connected in parallel therewith.

Figure 8:
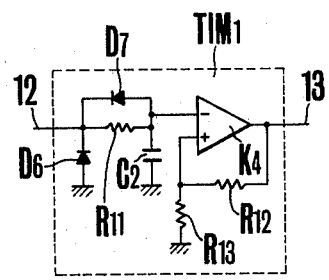
FIG. 8 is a connection diagram of the timer.
Figure 9:
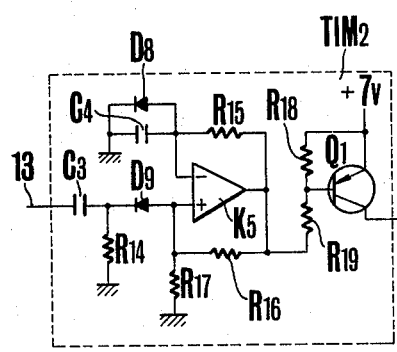
FIG. 9 is a connection diagram of the other timer.

Turning now to FIG. 8, a timer T1M1 comprises a resistor $R_{11}$ and a capacitor $C_2$. The DC signal from the recognition circuit REC charges the capacitor $C_2$ via the resistor $R_{11}$ to a predetermined level at which an amplifier having an operational amplifier $K_4$ and resistors $R_{12}$ and $R_{13}$ is inverted to produce an output on a line 13. An electric charge stored in the capacitor $C_2$ is rapidly discharged via a diode $D_7$ in the absence of the input signal on the line 12.

A timer T1M2 comprises a one-shot multivibrator including an operational amplifier $K_5$, diodes $D_8$ and $D_9$, resistors $R_{14}$ to $R_{17}$ and a capacitor $C_4$ and a switching transistor $Q_1$ associated with resistors $R_{18}$ and $R_{19}$. Thus an output of the operational amplifier continues for an interval which is determined by the resistor $R_{15}$ and the capacitor $C_4$. During the presence of the output, the transistor $Q_1$ is enabled to pass the signal on the line 14.

What is claimed is:

1. A multi-frequency signal receiver comprising an automatic gain control circuit for adjusting the level of said multi-frequency signal such that the level difference between high and low frequency signal components of said multi-frequency signal on the input side of the automatic gain control circuit is made equal to that on the output side when the level of said multi-frequency signal is constant, a plurality of bandpass filters for separating the output from said automatic gain control circuit into respective frequency signals, said bandpass filters being grouped into two groups, two detectors respectively detecting the output from said two groups of said bandpass filters for producing output voltages respectively proportional to the output from said two groups, a recognition circuit for producing an output when the level of the sum of outputs from said two detectors exceeds a predetermined level, and a plurality of gate circuits respectively responsive to the output from said recognition circuit for passing the outputs from said plurality of bandpass filters.

2. The multi-frequency signal receiver according to claim 1 which further comprises a first timer connected between the output of said recognition circuit and said plurality of gate circuits for producing an output when the output from said recognition circuit continues for an interval longer than a predetermined interval.

3. The multi-frequency signal receiver according to claim 2 which further comprises a second timer connected between the output of said first timer and said plurality of gate circuits.

* * * * *